United States Patent [19]

Lundin

[11] Patent Number: 4,993,871
[45] Date of Patent: Feb. 19, 1991

[54] OIL CATCHING BOOM
[75] Inventor: Lars Lundin, Porvoo, Finland
[73] Assignee: Oy Lars Lundin Patent Ab, Finland
[21] Appl. No.: 469,444
[22] PCT Filed: Oct. 14, 1988
[86] PCT No.: PCT/FI88/00169
§ 371 Date: Jun. 7, 1990
§ 102(e) Date: Jun. 7, 1990
[87] PCT Pub. No.: WO89/03457
PCT Pub. Date: Apr. 20, 1989
[30] Foreign Application Priority Data
Oct. 14, 1987 [FI] Finland .................... 874526
[51] Int. Cl.$^5$ .................... E02B 15/06
[52] U.S. Cl. .................... 405/68; 405/70; 405/72
[58] Field of Search .................... 405/26, 27, 63, 66, 405/68, 69, 70, 72; 210/242.1, 242.3, 923

[56] References Cited
U.S. PATENT DOCUMENTS

| | | | |
|---|---|---|---|
| 3,237,414 | 3/1966 | Straub et al. | 405/26 |
| 3,576,108 | 4/1971 | Rowland | 405/70 |
| 3,685,297 | 8/1972 | Juodis et al. | 405/70 X |
| 3,792,589 | 2/1974 | Sayles | 405/70 X |
| 4,104,884 | 8/1978 | Preuss | 405/68 |

FOREIGN PATENT DOCUMENTS 2728835  1/1979  Fed. Rep. of Germany ........ 405/63

Primary Examiner—David H. Corbin
Attorney, Agent, or Firm—Banner, Birch, McKie & Beckett

[57] ABSTRACT

An oil catching boom which comprises, on the one hand, an upper part in the form of a floating, flexible hose and, on the other hand, a skirt (3) attached under it and extending into the water. With the purpose of providing a boom the flexibility of which is easy to adjust according to intended use, the upper part is made up, on the one hand, of an outer hose (1) of a fabric-like material, open at its ends, and, on the other hand, of an inflatable inner hose (8) placed inside it. The flexibility of the inner hose or its division into segments is achieved by means of hose strictures which are produced, for example, by means of band-like throttling rings (11) fitted at predetermined intervals around the hose. A longer unit assembled from boom parts can be equipped with an inflation hose extending over its hole length.

5 Claims, 2 Drawing Sheets

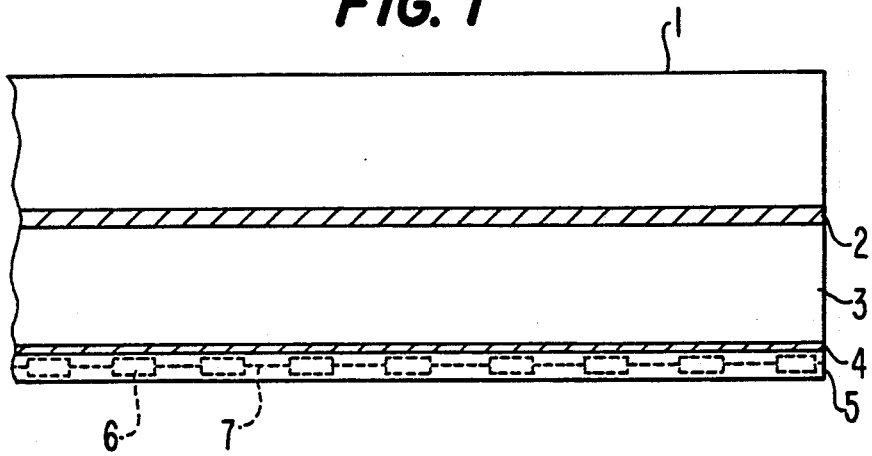
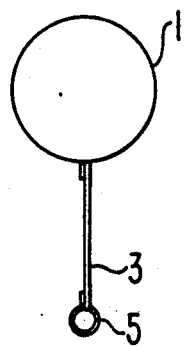
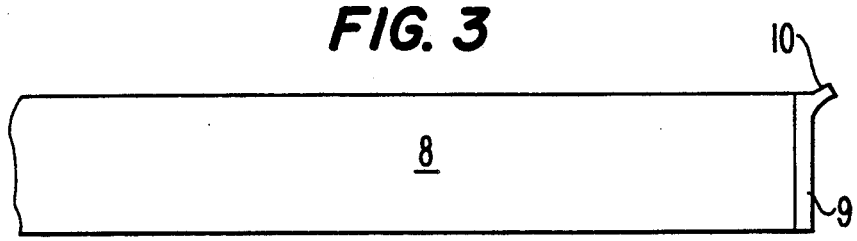
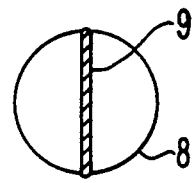
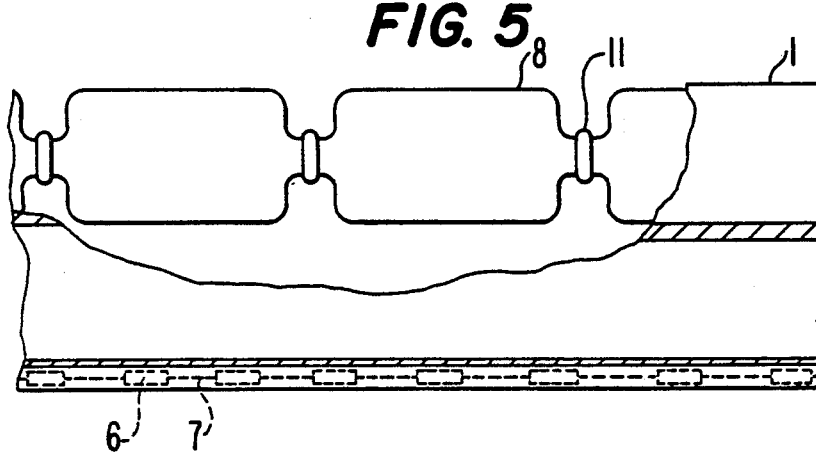
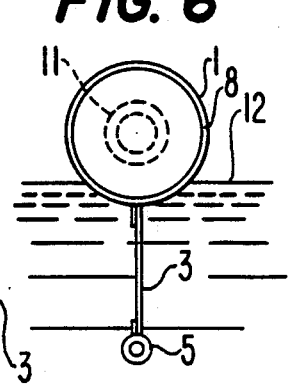

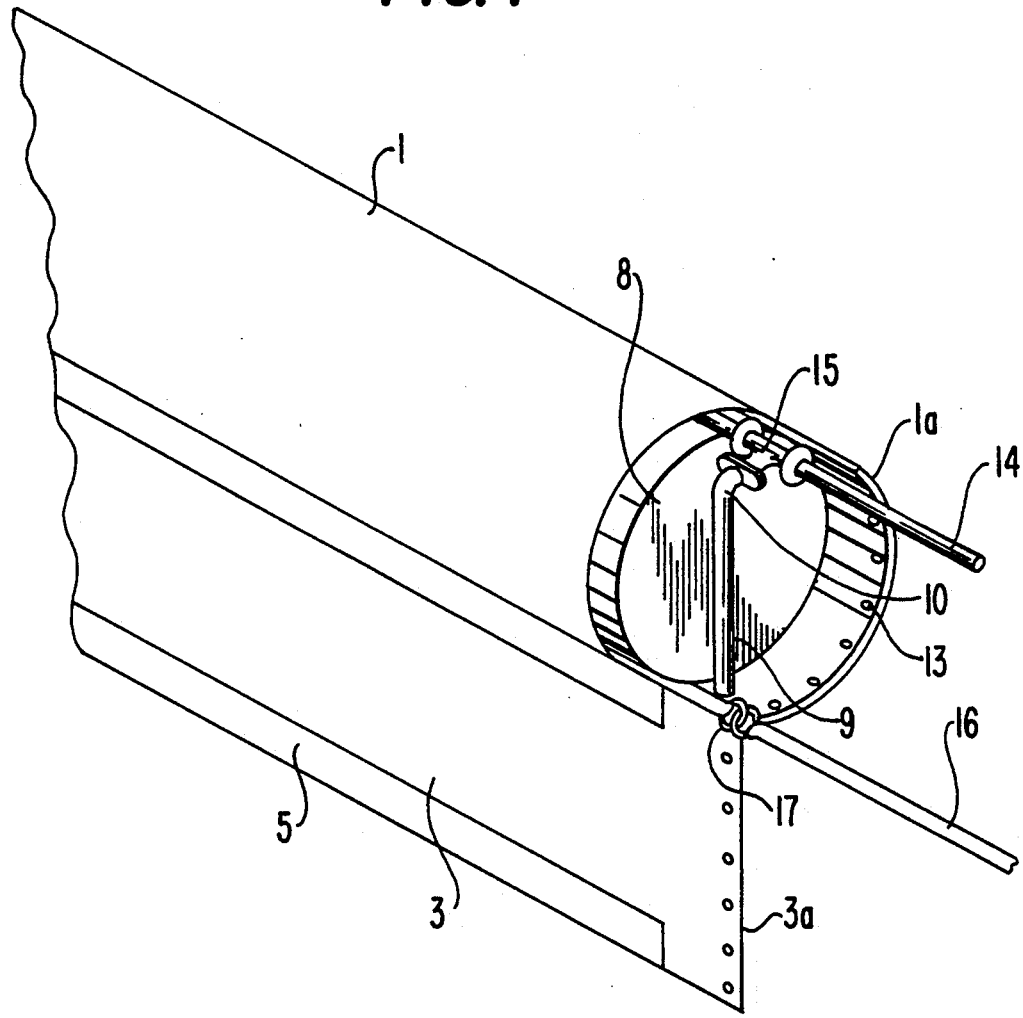

OIL CATCHING BOOM

The present invention relates to an oil catching boom which comprises an upper part in the form of a flexible hose, floating on the surface of water, and a skirt, attached under it, extending downwards over a certain distance into the water, the upper part of the boom being made up of an outer hose of a fabric-like material and an inflatable inner hose placed inside it.

Such an oil catching boom is known, for example, from DE application publication 27 28 291. Often the boom is built up of successive segments so that it will be more flexible and can adapt to sea swell without oil escaping over the boom or under the skirt of the boom. Often the lower edge of the skirt is provided with weights so that it remains continuously vertical despite sea swell, for example. Booms intended for calmer waters are in general made straight and continuous, since the flexible structure is, of course, more complicated and more expensive.

The object of the present invention is to provide an oil catching boom which has a very simple construction and can be used either in a substantially straight form in calm waters or in a flexible form in open-sea conditions. To achieve this object, the invention is characterized in that the inner hose is provided at certain intervals with strictures to increase its flexibility. The strictures are produced, for example, by means of throttling rings, placed at certain intervals around the inner hose, the rings being preferably of a band-like material.

The invention and its other characteristics and advantages are described below in the form of an example and with reference to the accompanying drawing, in which FIG. 1. depicts a side view of the principal part of a boom according to the invention, FIG. 2 depicts an end view of the same principal part, FIG. 3 depicts a side view of the inner boom, FIG. 4 depicts an end view of the inner boom, FIG. 5 depicts a side view, in part in section, of a boom according to the invention, FIG. 6 depicts a top view of the boom according to FIG. 5, and FIG. 7 depicts a perspective view, more complete, of a boom according to the invention.

In the figures, reference numeral 1 indicates the upper part of the boom. This part is of some suitable oil-resistant fabric-like material. When the boom is not in use, part 1 can thus be completely deflated, although in FIGS. 1 and 2 it is shown as having a circular cross section.

To the upper part 1 there is attached by a longitudinal seam 2 a skirt 3, extending directly downwards, to the lower edge of which there is attached, also by a seam 4, a hose-like edge 5. Inside this hose-like edge there is a weight which keeps the skirt vertical and, in the form depicted, comprises several weights 6 placed inside the lower hose 5 and interconnected with a rope 7.

The upper part of the boom includes the inner hose 8, depicted in FIG. 3, which is closed by a seam 9 at each end and provided with at least one nipple 10 for inflation. This inner hose is designed to be placed inside the flexible outer hose 1 of the boom and is dimensioned so that, when inflated, it fills the outer hose 1.

Because of the inner hose 8, the boom can be conveniently arranged to bend like a segment without the "articulation points" between the segments causing a risk of leakage. It is, of course, possible to provide the inner hose 8 in advance with strictures, but in practice it is much simpler to produce the strictures, for example, by means of throttling rings 11 placed around a uniform hose 8 and made of a flexible band material, as outlined in FIG. 5. This additionally results in the advantage that the length of the segments, in other words, the distance between the throttling rings 11, can be adjusted according to need at any given time. In calm waters, an inner hose 8 completely without strictures can be used. The number of strictures, as well as the degree to which the hose has been inflated, of course determine the properties and floating depth of the boom. In FIG. 6, water surface is indicated by reference numeral 12.

FIG. 7 finally is a perspective view of a boom according to the invention, on a somewhat larger scale and more complete.

The upper part 1 and the skirt 3 are made so as to exceed the length of the inner hose 8 on one side, more precisely in areas 1a and 3a. These areas are provided with holes 13 or corresponding means with which successive boom parts can be interconnected in advance before being launched. The still uninflated boom parts are usually kept on the deck of a vessel in a large coil the length of which may be, for example, some two hundred meters, consisting of 5–10 interconnected parts.

For inflating, a hose 14 can be placed inside the upper part 1, the hose 14 being connected to the inflation nipple 10 by means of a connection piece 15. The connection piece 15 may be a separate T-piece, so that producing a continuous hose line 14 at the boom-assembling stage is simple.

The connection piece may also be provided with a pressure-limiting valve. Inside the upper part 1 there may also be a tow rope 16, extending through the entire boom. To facilitate assembly, the rope 16 may be divided into parts between which there are interconnecting means 17.

When the whole boom is in flat form in a coil from which it is uncoiled for use, the inner parts 8 can be inflated by pumping air through the hose 14 connected to the center of the coil, since this hose remains unobstructed even in a coil. The larger inner hose 1 is inflated as it is released from the coil.

I claim:

1. An oil catching boom which comprises an upper part (1) in the form of a flexible hose floating on water surface and a skirt (3) attached under it and extending downwards over a certain distance into the water, the upper part of the boom being made up of an outer hose (1) of a fabric-like material and an inflatable inner hose (8) placed inside it, characterized in that the inner hose (8) is provided at certain intervals with strictures to increase its flexibility, said strictures being produced by means of flexible throttling rings (11) placed around the hose (8).

2. An oil catching boom according to claim 1, characterized in that the throttling rings are placed freely around the inner hose (8) so that the distance between the rings (11) can be varied.

3. An oil catching boom according to claim 1, characterized in that the throttling rings (8) are of band-like material.

4. An oil catching boom according to claim 1, in which several boom parts are interconnected in succession to form one unit, characterized in that the unit is fitted with an inflation hose (14) extending along it and being connected (15) to each inner hose (8).

5. An oil boom according to claim 4, characterized in that at each connection piece (15) the inflation hose (14) can be taken apart to facilitate the assembling of the boom unit.

* * * * *